United States Patent [19]

Quinby

[11] 3,971,944

[45] July 27, 1976

[54] NEUTRON DOSIMETRY

[75] Inventor: Thomas C. Quinby, Kingston, Tenn.

[73] Assignee: The United States of America as represented by the United States Energy Research and Development Administration, Washington, D.C.

[22] Filed: May 29, 1975

[21] Appl. No.: 582,057

[52] U.S. Cl. .............................. 250/391; 250/472; 250/358 R
[51] Int. Cl.² ........................................ G01T 3/00
[58] Field of Search .......... 250/390, 391, 392, 358, 250/472, 473

[56] References Cited
UNITED STATES PATENTS

| 3,617,747 | 11/1971 | Wilkinson | 250/391 |
| 3,719,825 | 3/1973 | Snajdr | 250/391 |

OTHER PUBLICATIONS

Preparation of Neutron Desimeter for Reactors, Nuclear Instruments and Methods, 102, No. 3, (Aug.), 1972, pp. 437–441.

In–Core Flux Detectors for Nuclear Power Reactor; R. B. Shields, Aecl. Res. Eng., (Canada Feb. 1971), pp. 14–16.

Primary Examiner—Alfred E. Smith
Assistant Examiner—Tommy P. Chin
Attorney, Agent, or Firm—Dean E. Carlson; David S. Zachry; Allen H. Uzzell

[57] ABSTRACT

A method of measuring neutron radiation within a nuclear reactor is provided. A sintered oxide wire is disposed within the reactor and exposed to neutron radiation. The induced radioactivity is measured to provide an indication of the neutron energy and flux within the reactor.

5 Claims, No Drawings

NEUTRON DOSIMETRY

This invention was made in the course of, or under, a contract with the Energy Research and Development Administration. It relates generally to the art of nuclear reactor dosimetry.

BACKGROUND OF THE INVENTION

In a nuclear reactor, the neutron flux and energy distribution are indications of various conditions, the knowledge of which is essential to the control of the reactor. Neutron dosimetry is carried out by fabricating dosimeters each containing a known number of atoms of a dosimeter target nuclide, placing the dosimeters in various locations within the reactor, and measuring the radioactivity imparted to the dosimeter by the neutron radiation. These dosimeters may contain fissile nuclides which, upon neutron irradiation, form radioactive fission fragments or stable nuclides which are transmuted into radionuclides upon neutron irradiation. The above nuclear processes are quantitative, so the radioactivity induced in the dosimeter target material during a given exposure time is proportional to the neutron flux and to the cross-section for the particular reaction. Since the cross-section is a function of neutron energy, the radiation count rate from exposed dosimeters is an indication of both the neutron flux and neutron energy. By disposing dosimeters of various target materials in various locations throughout the reactor, a profile or core characterization of neutron energy and flux can be calculated.

Suitable materials for dosimeter targets may be any nuclide which generates a radionuclide upon neutron irradiation. Any fissile material is suitable because these materials undergo fission upon exposure to neutrons, producing characteristic radioactive fission fragments. Most stable nuclides are also suitable as dosimeter targets as they generate radioactive activation products upon neutron irradiation.

In order to provide an accurate and reproducible representation of the neutron flux and energy within a reactor, each dosimeter should be of uniform thickness and contain a known number of atoms of the target nuclide. In addition, the target nuclide should be uniformly distributed throughout the dosimeter.

DESCRIPTION OF THE PRIOR ART

In the prior art, neutron dosimetry was carried out by placing dosimeters comprising small (0.02–0.03 inch interior diameter) sealed vanadium tubes containing oxide powders of certain metal nuclides at various locations within a reactor. The oxides were used because of their high temperature stability, resistance to oxidation, and compatibility with vanadium. The dosimeters were fabricated by manually loading the oxide powders into the tubes with hypodermic needles, a tedious and error prone process. The amount of powder to be loaded in each tube varied from 0.1 mg. to 8 mg., so very small quantities of materials had to be handled manually. The required accuracy in loading was ±1%, a difficult requirement to meet. A repetitive weighing routine requiring five weighings was carried out both before and after loading to ensure accuracy, followed by weld closure of the tubes. The weld closure often caused loss of powder material, rendering the dosimeter unfit for use. The radioactive nature of some target powders required that the loading and weighing operations be carried out in glove boxes, further hindering the accuracy of the procedure. Even after the tedious weighing and loading process, 30–70% of the dosimeters contained an improper amount of target nuclide and had to be rejected. The unit cost for the dosimeters was $120, attributable mostly to the high rejection rate and the labor costs of the fabrication process.

While the neutron radiation analysis can be carried out with much smaller quantities of target nuclides, the accuracy requirement and the materials handling difficulties necessitate the use of material amounts on the order of a milligram. While the amounts are insignificant in the case of stable isotopes of materials such as Fe, Cu, Ag, etc., they represent a significant expense when materials such as isotopes of U, Pu, Np, etc., are used. In addition, some nuclides were unsuitable for dosimetry applications because their neutron activation products were too radioactive. Aside from presenting a hazard to personnel, the radiation count rate from amounts as great as 1 mg. was too high to be quantitatively measured. It has heretofore not been practical to use dilutions of such oxides because neither uniformity of composition nor uniformity of distribution of the materials within the dosimeter tubes could be assured. A further limitation in the prior art was that certain nuclide oxides could not be used because they were incompatible with the vanadium housing material.

SUMMARY OF THE INVENTION

It is an object of the present invention to provide a method of measuring neutron radiation which eliminates the use of powders as dosimeter target materials.

It is a further object to provide a method which reduces the requirement for repetitive weighing of dosimeters.

It is a further object to reduce the requirement for expensive radioisotopes as dosimeter target material.

It is a further object to eliminate the requirement for dosimeter housings in many cases.

It is a further object to provide a neutron dosimeter which comprises an extruded sintered oxide wire encapsulated within a co-extruded housing.

These and other objects are accomplished by providing a method for measuring neutron radiation within a nuclear reactor comprising placing one or more extruded sintered metal oxide wires comprising a dosimeter target oxide within said reactor, exposing the wires to neutron radiation, and measuring the radioactivity induced in the wires. An oxide of the dosimeter target nuclide is extruded into a wire and sintered to achieve greater density. The sintered oxide wire is easily cut into appropriate lengths and may be deployed as a dosimeter material either with or without a housing. In addition, dosimetry with dilutions of the dosimeter target oxides in diluent oxide matrix such as $Al_2O_3$ or BeO may now be accomplished using wire extruded from the mixed oxide powder and sintered. These mixed oxide wires have been found to be sufficiently uniform for quantitative neutron analyses.

DETAILED DESCRIPTION

According to the present invention, neutron dosimetry may now be carried out with extruded sintered oxide wires of the desired nuclide. These sintered wires are the dosimeter target material and contain a known amount of target nuclide. Neutron dosimetry is carried out by placing these wires, housed or unhoused, in various locations within the reactor and measuring the radioactivity imparted to the wires by the neutron radiation. These dosimeter wires are placed within the core of the reactor, usually directly in the fuel rods. As many as 25 or 30 individual dosimeters of different target nuclides are used in one core position, and as many as 10 to 20 core positions may be monitored per core characterization. The dosimeter wires are preferably small, about 0.2 inch in diameter, and vary in length from 0.120 inch to 0.310 inch. This small size permits point characterization of neutron radiation within the core. The oxide wires of this invention may be used without individual housing, i.e., unhoused wires in a composite dosimeter package.

When housings are required, the sintered wires may be directly weighed before placement within the dosimeter housing, greatly reducing the labor required for the loading and weighing of dosimeters and increasing the accuracy of the weight measurement. Because powdered oxides are no longer used, the problem of target material loss during weld closure has been eliminated. Accuracy of nuclide content can now be routinely achieved at ±0.2% or better, with no detectable loss during loading. The unit fabrication cost of dosimeters has been reduced from $120 to $50, representing a savings of up to $42,000 for a single reactor.

An aspect of the present invention involves the production of dosimeters of mixed oxides. It has been found according to the present invention that wires extruded from mixtures of desired oxides and sintered will be highly uniform, having less than 1% variance in composition throughout the length of the wire. A variance of no more than 1% is required for quantitative measurements. This high uniformity is routinely achieved in mixtures having as little as 0.1% composition by weight of the desired dosimeter target oxide. At concentrations less than 0.1% the required uniformity is difficult to ensure.

The capability of producing uniform mixtures greatly reduces the requirement for expensive radionuclides. Practically all nuclide oxides may now be used in dosimetry. Those nuclide oxides which became too radioactive or were incompatible with the vanadium housing may now be used as uniform mixtures or dilutions in a diluent oxide. Diluent oxides are those oxides, such as $Al_2O_3$ and $BeO$, which are chemically stable and non-volatile below 1200°C and have short-lived neutron activation products which decay completely in about one day. While any degree of dilution would decrease the nuclide requirement and be an improvement over the prior art, the desired nuclide content is usually determined by the radioactivity of the activation product.

It has also been found that the extruded wires of the present process have almost perfect circular cross section. This property, coupled with the accuracy in nuclide content now attainable, will significantly increase the reproducibility and accuracy of neutron radiation measurement in nuclear reactors.

Nearly every metal nuclide oxide may now be used as a neutron dosimetry target material. According to the method of the present invention, a dosimeter target oxide may now be defined as a metal nuclide oxide that is chemically stable and non-volatile below 1200°C, that has a melting point above 1200°C, and that has a neutron activation product with a half-life greater than about one day. Metals which have been used successfully include U, Np, Sc, Pu, Ni, Mn, Cu, Fe, Ti, Ta, and Ag.

The sintered oxide wire used in the dosimetry process of the subject invention does not fragment when cut, has excellent nondusting qualities, and has sufficient dimensional strength and thermal stability to be used without a housing in high temperature applications where conventional housing materials may soften and cannot be used.

The dosimeter wires used in the process of the present invention may be produced according to the following examples.

EXAMPLE I

The desired oxide powder is thoroughly mixed with a binder such as paraffin or methyl cellulose. The minimum ratio of binder to oxide powder is about 1.5 – 10. The mix can be extruded easily into a wire about 0.02 inch diameter at room temperature, at a rate of about 1 inch per second. The extruded mix is then heated in a vacuum to volatilize the binder and finally the wire is sintered in air, argon or vacuum to increse the density of the oxide wire. A density of 40 – 60% theoretical is suitable for dosimetry application. The wire is then cut to the desired length. The following table provides parameters for room temperature extrusion of several paraffin-bound oxides.

| Dosimeter Material | Extrusion Die Pressure (psi) | Sintering Temp., °C | Sintering Time, hr | Sintering Atmosphere |
| --- | --- | --- | --- | --- |
| $UO_2$ | 14,500 | 1600 | 8 | Vacuum |
| $NpO_2$ | 14,500 | 1450 | 8 | Air |
| $Sc_2O_3$ | 30,000 | 1450 | 8 | Air |
| $PuO_2$ | 14,500 | 1450 | 8 | Air |
| Dilutions in $Al_2O_3$ | 14,500 | 1800 | 8 | Vacuum or air |

EXAMPLE II

Oxide dilutions may be prepared by first providing a mixed oxide powder. This powder may be prepared by co-precipitating the desired dosimeter target nuclide with a diluent metal such as Al or Be, as insoluble hydroxides, followed by heating to convert the hydroxides to oxides. The wires are then prepared as in Example I. The sintering step enhances the uniformity of composition of the finished wire.

EXAMPLE III

The need for manual encapsulation of the wires into the housing may be eliminated by co-extruding an oxide housing with the desired dosimeter target oxide or dilution in a co-axial extrusion process. This eliminates the need for manual encapsulation of the wires into the housing. The resulting compound wire is prepared as in Example I to form an oxide housed neutron dosimeter. The content of target nuclide is then determined by neutron activation analysis. The fabrication process reduces human error and the exposure of personnel to harmful radiation doses from radioactive target material. Oxide housings are particularly useful in high temperature gas cooled reactors where chemical reactions between reactor graphite and metallic dosimeter housings can occur.

What is claimed is:
1. A method of measuring neutron radiation within a nuclear reactor comprising placing one or more oxide wires comprising a dosimeter target oxide within the reactor and measuring the radioactivity induced in said wires by said neutron radiation, said wires being extruded from an oxide extrusion mix, sintered to 40–60% theoretical density, and cut to the desired length, said oxide extrusion mix comprises an oxide dilution containing at least 0.1% by weight of the dosimeter target oxide in a diluent oxide.

2. The method of claim 1 wherein said wires have uniformity of composition of less than 1% variance throughout the length of said wire.

3. The method of claim 1 wherein said diluent oxide is selected from the group consisting of $Al_2O_3$ and BeO.

4. The method of claim 1 wherein said wires are encapsulated within a co-extruded housing.

5. The method of claim 1 wherein said extrusion mix is provided by first coprecipitating a mixture of target nuclide hydroxide and diluent metal hydroxide, heating the resulting hydroxide mixture to provide an oxide mixture, and mixing the oxide mixture with a binder.

* * * * *